(12) United States Patent
Ataku et al.

(10) Patent No.: US 8,461,242 B2
(45) Date of Patent: Jun. 11, 2013

(54) LIQUID COMPOSITION

(75) Inventors: Masakazu Ataku, Chiyoda-ku (JP); Hiroki Kamiya, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 590 days.

(21) Appl. No.: 12/431,804

(22) Filed: Apr. 29, 2009

(65) Prior Publication Data

US 2009/0214932 A1 Aug. 27, 2009

Related U.S. Application Data

(63) Continuation of application No. PCT/JP2007/071036, filed on Oct. 29, 2007.

(30) Foreign Application Priority Data

Oct. 30, 2006 (JP) .................. 2006-293701

(51) Int. Cl.
*C08K 5/053* (2006.01)
*C08L 27/12* (2006.01)

(52) U.S. Cl.
USPC ........... 524/386; 524/387; 524/388; 524/544; 524/546; 521/25; 521/27; 521/28; 521/38

(58) Field of Classification Search
USPC ........... 524/386, 287, 388, 544, 387; 521/25, 521/28, 38
See application file for complete search history.

(56) References Cited

U.S. PATENT DOCUMENTS

| 2,656,330 | A | 10/1953 | Sprung et al. | |
|---|---|---|---|---|
| 6,277,512 | B1 * | 8/2001 | Hamrock et al. | 429/33 |
| 2004/0062972 | A1 * | 4/2004 | Hara et al. | 429/33 |
| 2004/0096724 | A1 * | 5/2004 | Debe et al. | 429/37 |
| 2006/0199062 | A1 * | 9/2006 | Yanagita et al. | 429/33 |

FOREIGN PATENT DOCUMENTS

| EP | 0 066 369 A1 | 12/1982 |
|---|---|---|
| JP | 57192464 A | 11/1982 |
| JP | 2003055568 A | 2/2003 |
| JP | 2003086190 A | 3/2003 |
| JP | 2003528438 T | 9/2003 |
| JP | 2004035864 A * | 2/2004 |
| JP | 2006164845 A | 6/2006 |
| WO | WO 98/16581 | 4/1998 |

OTHER PUBLICATIONS

Machine translation of Tanuma et al., JP 2004035864A.*

* cited by examiner

*Primary Examiner* — Mark Eashoo
*Assistant Examiner* — Nicole M Buie-Hatcher
(74) *Attorney, Agent, or Firm* — Oblon, Spivak, McClelland, Maier & Neustadt, L.L.P.

(57) ABSTRACT

To provide a liquid composition containing a fluoropolymer having sulfonic acid functional groups, which rarely corrodes a metal and has good handling efficiency, which liquid composition comprises a fluoropolymer having sulfonic acid functional groups and a solvent, wherein the solvent contains a polyhydric alcohol and a monohydric alcohol. The content of the fluoropolymer is preferably from 5 to 50 mass % in the liquid composition (100 mass %), and the content of the polyhydric alcohol is preferably from 5 to 50 mass % in the solvent (100 mass %).

16 Claims, 2 Drawing Sheets

LIQUID COMPOSITION

TECHNICAL FIELD

The present invention relates to a liquid composition containing a fluoropolymer having sulfonic acid functional groups.

BACKGROUND ART

Heretofore, a fluoropolymer having sulfonic acid functional groups have been used as an electrolyte membrane for polymer electrolyte fuel cells since its ion conductivity, durability and heat resistance are excellent. A liquid composition in which such a fluoropolymer is dissolved or dispersed in a solvent, is used for forming an electrolyte membrane by a casting method. Further, the liquid composition is used as a coating agent for repairing the electrolyte membrane or for other applications.

As the liquid composition, a liquid composition has been known, which comprises from 2 to 18 mass % of a perfluorinated ion-exchange polymer (fluoropolymer) having sulfonic acid functional groups, and from 82 to 98 mass % of the following mixture (solvent) (Patent Document 1):

A solvent comprising from 20 to 90 mass % of water, and from 10 to 80 mass % of at least one member selected from the group consisting of methanol, ethanol, n-propanol, isopropanol, n-butanol and 2-butanol.

However, such a liquid composition has following problems:

(1) Since the solvent contains a large amount of water, when the liquid composition is used for an application to contact with a metal device, metal corrosion tends to take place.

(2) In a case where the water contained in the solvent is reduced, if a shearing force such as stirring is applied to the liquid composition, the viscosity of the liquid composition becomes temporarily raised, and thus, handling efficiency tends to be poor at the time of preparation of the liquid composition or at the time of film-forming by a casting method.

(3) In a case where the water contained in the solvent is reduced, if the content of the fluoropolymer is increased, the viscosity of the liquid composition increases, and thus, handling efficiency tends to be poor at the time of preparation of the liquid composition or at the time of film-forming by a casting method.

Patent Document 1: JP-A-57-192464 (Claims)

DISCLOSURE OF THE INVENTION

Object to be Accomplished by the Invention

The present invention provides a liquid composition containing a fluoropolymer having sulfonic acid functional groups, which rarely corrodes a metal and has good handling efficiency.

Means to Accomplish the Object

The liquid composition of the present invention comprises a fluoropolymer having sulfonic acid functional groups and a solvent, wherein the solvent contains a polyhydric alcohol and a monohydric alcohol.

The content of the fluoropolymer is preferably from 5 to 50 mass % in the liquid composition (100 mass %).

The content of the solvent is preferably from 50 to 95 mass % in the liquid composition (100 mass %).

The content of the polyhydric alcohol is preferably from 5 to 50 mass % in the solvent (100 mass %).

The polyhydric alcohol is preferably a dihydric alcohol.

The content of the monohydric alcohol is preferably from 50 to 95 mass % in the solvent (100 mass %).

The polyhydric alcohol is preferably one member selected from the group consisting of ethylene glycol, 1,2-propanediol and 1,3-propanediol, and the monohydric alcohol is preferably ethanol.

The fluoropolymer is preferably a copolymer having constituting units based on a monomer represented by the following formula (1) and constituting units based on a monomer represented by the following formula (2), or preferably a copolymer obtained by hydrolyzing the above copolymer to convert W to a sulfonic acid group:

$$CF_2=CX_aX_b \quad (1)$$

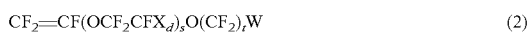

$$CF_2=CF(OCF_2CFX_d)_sO(CF_2)_tW \quad (2)$$

wherein each of $X_a$ and $X_b$ is independently a fluorine atom, a chlorine atom, a hydrogen atom or a trifluoromethyl group, $X_d$ is a fluorine atom or a trifluoromethyl group, s is an integer of from 0 to 2, t is an integer of from 1 to 3, and W is a precursor group which can be converted to a sulfonic acid group by hydrolysis.

The monomer represented by the formula (1) is preferably $CF_2=CF_2$, and the monomer represented by the formula (2) is preferably $CF_2=CFOCF_2CF(CF_3)OCF_2CF_2CF_2SO_2F$.

The water content in the solvent is preferably at most 5 mass %. The water content in the liquid composition is preferably at most 5 mass %.

Further, an ion-exchange capacity of the fluoropolymer is preferably from 0.8 to 1.3 meq/g dry resin.

Effects of the Invention

The liquid composition of the present invention rarely corrodes a metal and has good handling efficiency.

BEST MODE FOR CARRYING OUT THE INVENTION

Figure 1:
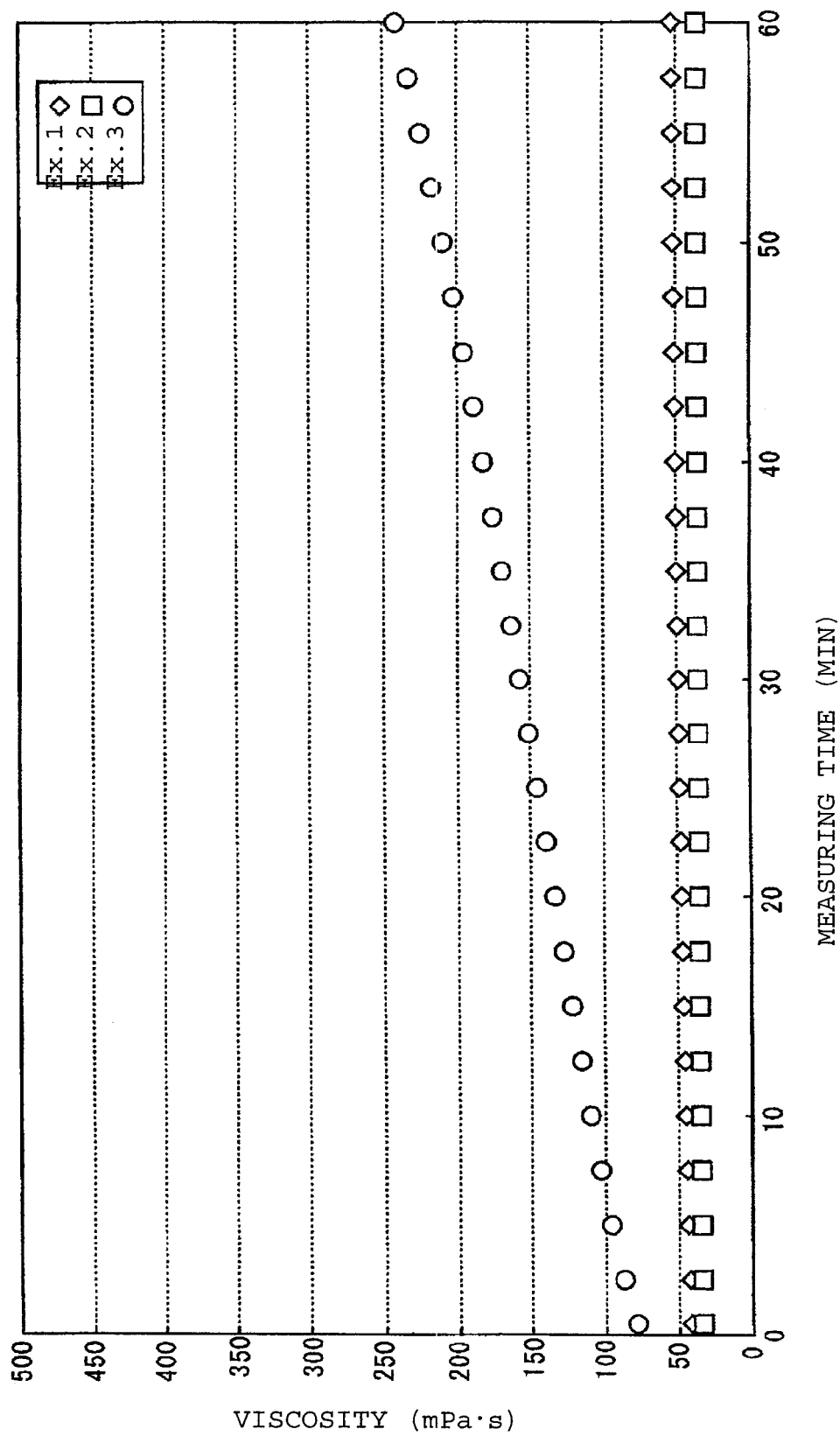
FIG. 1 is a graph showing a viscosity change against a measuring time of each liquid composition of Examples 1 to 3 at 25° C.

In the present specification, a monomer represented by the formula (1) is shown as a monomer (1). The same applies to other monomers represented by other formulae.

Solvent

The solvent contains a polyhydric alcohol and a monohydric alcohol. By using a solvent mixture of the polyhydric alcohol and the monohydric alcohol as the solvent, it is possible to effectively suppress the viscosity increase of the liquid composition.

The polyhydric alcohol may be a dihydric alcohol such as ethylene glycol, 1,2-propanediol, 1,3-propanediol, 1,2-butanediol, 1,3-butanediol, 1,4-butanediol, 1,2-pentanediol, 1,4-pentanediol, 1,5-pentanediol or 2,4-pentanediol; or a trihydric alcohol such as glycerol or 1,2,4-butanetriol.

The polyhydric alcohol is preferably a dihydric alcohol, particularly preferably ethylene glycol, from the viewpoint that the viscosity increase of the liquid composition can be suppressed more effectively.

Such polyhydric alcohols may be used alone or in combination as a mixture of two or more of them.

The content of the polyhydric alcohol is preferably from 5 to 50 mass %, more preferably from 15 to 50 mass %, particularly preferably from 20 to 50 mass %, in the solvent (100 mass %). When the content of the polyhydric alcohol is at least 5 mass %, there is an effect of reducing the viscosity if a shearing force is applied. When the content of the polyhydric alcohol is at most 50 mass %, there is an effect of stabilizing the viscosity.

The monohydric alcohol may be methanol, ethanol, n-propanol, 2-propanol, n-butanol, 2-butanol, 2-methyl-2-propanol, n-pentanol, 2-pentanol or 3-pentanol, and ethanol is preferred.

Such monohydric alcohols may be used alone or in combination as a mixture of two or more of them.

The content of the monohydric alcohol is preferably from 50 to 95 mass %, more preferably from 50 to 85 mass %, particularly preferably from 50 to 80 mass %, in the solvent (100 mass %). When the content of the monohydric alcohol is at least 50 mass %, the viscosity of the solvent becomes low, whereby it is possible to decrease the viscosity of the liquid composition. When the content of the monohydric alcohol is at most 95 mass %, there is an effect of reducing the viscosity if a shearing force is applied.

The solvent is preferably a solvent mixture of ethylene glycol and ethanol, a solvent mixture of 1,2-propanediol and ethanol or a solvent mixture of 1,3-propanediol and ethanol, from the viewpoint that the viscosity increase of the liquid composition can be suppressed more effectively, and that it is easily available.

The solvent may contain another organic solvent except for an alcohol as the case requires. The content of such another organic solvent is preferably at most 5 mass % in the liquid composition (100 mass %). Such another organic solvent may be a ketone, an ether or an ester.

The solvent may sometimes contain water by water absorption, etc. The water content is preferably at most 5 mass %, more preferably at most 1 mass %, particularly preferably at most 0.5 mass %, in the liquid composition (100 mass %), from the viewpoint of suppressing corrosion of a metal. Further, the water content in the solvent is preferably at most 5 mass %, more preferably at most 1 mass %, particularly preferably at most 0.5 mass %.

Fluoropolymer

The fluoropolymer has sulfonic acid functional groups. The sulfonic acid functional group is a sulfonic acid group (—$SO_3H$ group), a salt of a sulfonic acid group or a precursor group (such as a —$SO_2F$ group) which can be converted to a sulfonic acid group by hydrolysis.

The fluoropolymer of the present invention has an ion-exchange capacity (meq of fixed ions in 1 g of a dry resin) of preferably from 0.8 to 1.3 meq/g dry resin, particularly preferably from 0.9 to 1.2 meq/g dry resin, from the viewpoint of the solubility in a solvent, the ion conductivity, the polymer strength, etc.

The fluoropolymer is preferably a copolymer having constituting units based on a monomer (1) and a constituting unit based on a monomer (2), or a copolymer obtained by hydrolyzing the above copolymer to convert W to a sulfonic acid group:

$$CF_2=CX_aX_b \quad (1)$$

$$CF_2=CF(OCF_2CFX_d)_sO(CF_2)_tW \quad (2)$$

wherein each of $X_a$ and $X_b$ is independently a fluorine atom, a chlorine atom, a hydrogen atom or a trifluoromethyl group, $X_d$ is a fluorine atom or a trifluoromethyl group, s is an integer of from 0 to 2, t is an integer of from 1 to 3, and W is a precursor group which can be converted to a sulfonic acid group by hydrolysis.

W is preferably —$SO_2X_e$ (wherein $X_e$ is a fluorine atom, a chlorine atom or a bromine atom) or —$SO_2R$ (wherein R is a $C_{1-4}$ alkyl group).

The process for converting W to a sulfonic acid group may, for example, be a process wherein when W is a —$SO_2F$ group, the —$SO_2F$ group is formed into a salt of a sulfonic acid group by hydrolysis in an alkaline medium, and then, the salt of a sulfonic acid group is converted to an acid form in an acidic medium.

The copolymerization ratio of the constituting units based on a monomer (1) to the constituting units based on a monomer (2) is preferably selected so that the equivalent of functional groups of the fluoropolymer to be formed, is in the above range.

As the monomer (1), monomers (1-1) to (1-5) are preferred:

$$CF_2=CF_2 \quad (1-1)$$

$$CF_2=CFH \quad (1-2)$$

$$CF_2=CFCl \quad (1-3)$$

$$CF_2=CH_2 \quad (1-4)$$

$$CF_2=CFCF_3 \quad (1-5)$$

As the monomer (2), monomers (2-1) to (2-4) are preferred:

$$CF_2=CFOCF_2CF(CF_3)OCF_2CF_2CF_2SO_2F \quad (2-1)$$

$$CF_2=CFOCF_2CF(CF_3)OCF_2CF_2SO_2F \quad (2-2)$$

$$CF_2=CFOCF_2CF_2CF_2SO_2F \quad (2-3)$$

$$CF_2=CFOCF_2CF_2SO_2F \quad (2-4).$$

Liquid Composition

The liquid composition of the present invention comprises the fluoropolymer and the solvent.

The content of the fluoropolymer is preferably from 5 to 50 mass %, more preferably from 5 to 30 mass %, particularly preferably from 5 to 25 mass %, in the liquid composition (100 mass %). When the content of the fluoropolymer is at least 5 mass %, film-forming can be carried out by a casting method, and the polymer can be well applied during coating. When the content of the fluoropolymer is at most 50 mass %, the handling efficiency in film-forming, coating, etc. will be proper.

The content of the solvent is preferably from 50 to 95 mass %, more preferably from 70 to 95 mass %, particularly preferably from 75 to 95 mass % in the liquid composition (100 mass %). When the content of the solvent is at least 50 mass %, the handling efficiency in film-forming, coating, etc. will be proper. When the content of the solvent is at most 95 mass %, film-forming can be carried out by a casting method, and the polymer can be well applied during coating.

The method for preparing the liquid composition may be a method in which the fluoropolymer and the solvent are introduced into an autoclave, followed by stirring for a certain period of time at a prescribed temperature.

In the liquid composition of the present invention as described above, the solvent contains a polyhydric alcohol and a monohydric alcohol, whereby it is possible to reduce water to be contained in the solvent. As a result, even if the liquid composition is contacted with a metal, corrosion of a metal rarely takes place.

Further, in the liquid composition of the present invention, a polyhydric alcohol and a monohydric alcohol are contained, whereby even if water in the solvent is reduced, the viscosity increase by a shear force is suppressed, and even if the content of a fluoropolymer having sulfonic acid functional groups is increased, the viscosity increase is suppressed. Therefore, the handling efficiency is good at the time of preparation of the liquid composition, or at the time of film-forming by a casting method, and the composition can be applied for various processes.

EXAMPLES

Now, the present invention will be described in further detail with reference to Examples but it should be understood that the present invention is by no means restricted thereto.

Examples 1, 2 and 4 to 7 are Examples of the present invention, and Example 3 is Comparative Example.

Viscosity Measurement

By using an E type viscometer TV-20 (manufactured by TOKI SANGYO CO., LTD.), the viscosity of the liquid composition was measured. As a rotor, No. 1 rotor was used, and the number of revolutions was set to be 50 rpm.

Water Content

By using a trace water measuring apparatus (CA-21 type, manufactured by Mitsubishi Chemical Corporation), the water amount contained in the solvent was measured.

Fluoropolymer

As a fluoropolymer having sulfonic acid functional groups, a copolymer (hereinafter referred to as a fluoropolymer A) was prepared, which was obtained in such a manner that a copolymer of a monomer (1-1) and a monomer (2-2) was hydrolyzed in an alkaline medium and then converted to an acid form in an acidic medium so that —$SO_2F$ groups were converted to sulfonic acid groups (—$SO_3H$ groups). The ion-exchange capacity of the fluoropolymer (A) was 1.1 meq/g dry resin. Here, the fluoropolymer A is one which was prepared specifically as follows.

680 g of $C_8F_{17}C_2H_5$, 0.8 g of azobisisobutyronitrile and 922 g of $CF_2=CFOCF_2CF(CF_3)OCF_2CF_2SO_2F$ were introduced into a stainless steel autoclave having an inner volume of 2 L, followed by deaeration sufficiently with a liquid nitrogen. Then, the temperature was adjusted at 70° C., tetrafluoroethylene was introduced therein, and the pressure was adjusted at 1.1 MPa by gauge pressure. In order to have a constant pressure during the polymerization, tetrafluoroethylene was sequentially added. After 8 hours, unreacted tetrafluoroethylene was purged to complete the polymerization. The obtained polymer solution was agglomerated with methanol, followed by washing and drying to obtain 180 g of a fluoropolymer.

Then, such a fluoropolymer was heated and mixed in a KOH aqueous solution containing methanol for hydrolysis to convert —$SO_2F$ groups to —$SO_3K$ groups. Then, the resultant was washed with water and then mixed in the presence of a sulfuric acid aqueous solution, for further conversion to —$SO_3H$ groups to obtain a —$SO_3H$ form fluoropolymer.

Example 1

A solvent mixture having a mixed ratio of ethanol to 1,2-propanediol (ethanol/1,2-propanediol) of 80/20 (mass ratio), was prepared. The water content of the solvent mixture was measured, and it was 965 ppm (0.0965 mass %). Therefore, ethanol was approximately 80 mass %, and 1,2-propanediol was approximately 20 mass %.

133 g (9.5 mass %) of the fluoropolymer A and 1,274 g (90.5 mass %) of the solvent mixture were introduced in an autoclave, followed by stirring at 80° C. to prepare a liquid composition. The water content in the liquid composition was 874 ppm.

Figure 2:
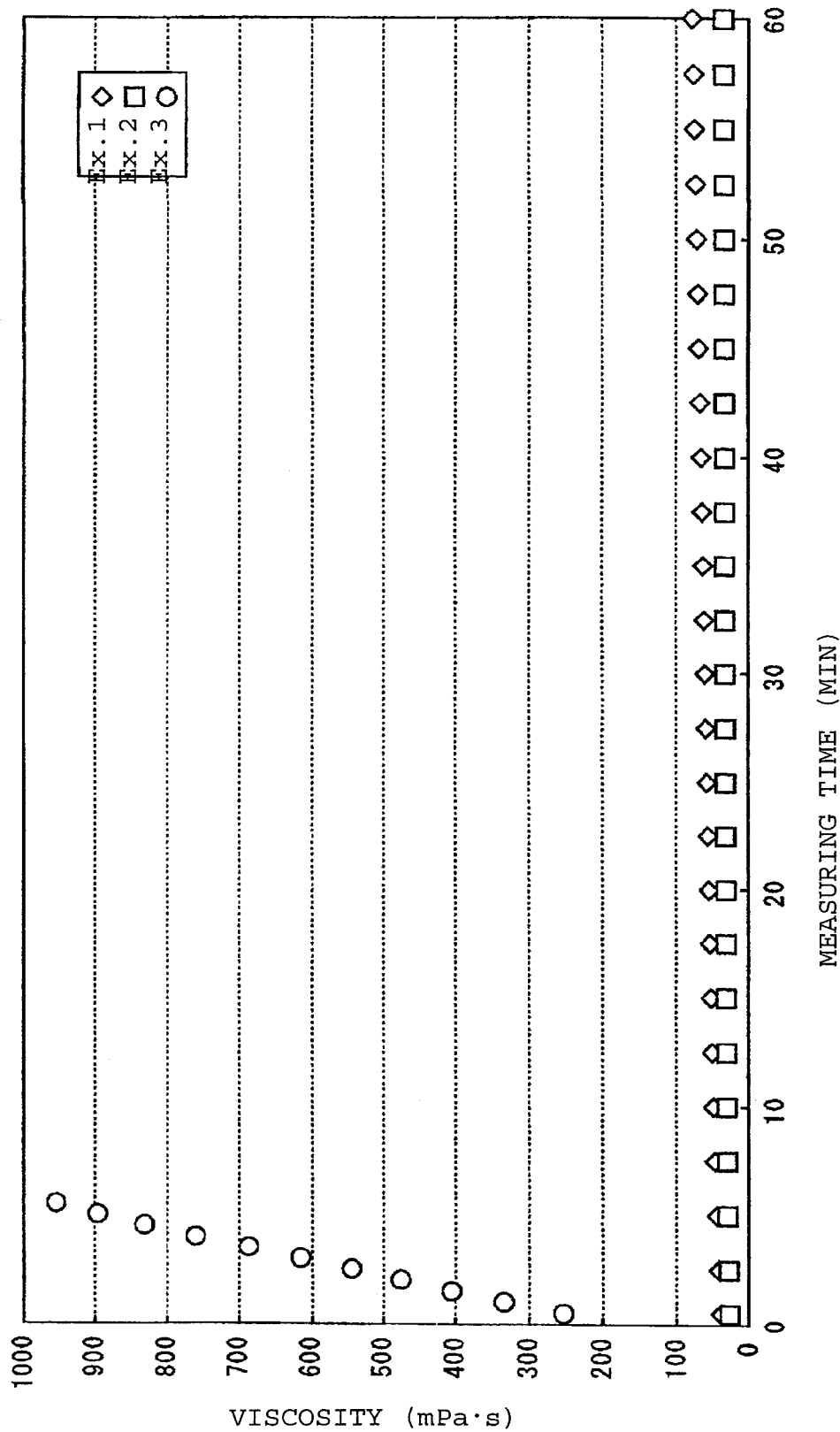
FIG. 2 is a graph showing a viscosity change against a measuring time of each liquid composition of Examples 1 to 3 at 40° C.

With respect to the liquid composition, a viscosity measurement was carried out at 25° C. for 60 minutes. Further, with respect to the liquid composition, a viscosity measurement was carried out at 40° C. for 60 minutes. Because of the rotation of a rotor of the viscometer, a shear force is applied to the liquid composition. Therefore, by measuring the viscosity change with time, the relation between the shear force and the viscosity of the liquid composition can be identified. The measurement results at 25° C. are shown in FIG. 1, and the measurement results at 40° C. are shown in FIG. 2.

Example 2

A solvent mixture having a mixed ratio of ethanol to ethylene glycol (ethanol/ethylene glycol) of 80/20 (mass ratio), was prepared. The water content of the solvent mixture was measured, and it was 831 ppm (0.0831 mass %). Therefore, ethanol was approximately 80 mass %, and ethylene glycol was approximately 20 mass %.

A liquid composition was prepared in the same manner as in Example 1 except for using the above solvent mixture, and the viscosity measurement was carried out. The measurement results at 25° C. are shown in FIG. 1, and the measurement results at 40° C. are shown in FIG. 2. The water content in the liquid composition is 752 ppm.

Example 3

Ethanol was prepared as a solvent. The water content of the solvent was measured, and it was 814 ppm (0.0814 mass %). Therefore, ethanol was approximately 100 mass %.

A liquid composition was prepared in the same manner as in Example 1 except for using the above solvent, and the viscosity measurement was carried out. The measurement results at 25° C. are shown in FIG. 1, and the measurement results at 40° C. are shown in FIG. 2. The water content in the liquid composition is 737 ppm.

According to the results in FIG. 1 and FIG. 2, with respect to the liquid compositions in Examples 1 and 2, in which each solvent contains a polyhydric alcohol, it is evident that the viscosity rarely increases, even if a shear force is applied.

Example 4

The same solvent mixture as in Example 2 was prepared.

210 g (15 mass %) of the fluoropolymer A and 1,190 g (85 mass %) of the solvent mixture were introduced in an autoclave, followed by stirring at 80° C. to prepare a liquid composition. The water content in the liquid composition was 706 ppm. With respect to the liquid composition, the viscosity measurement was carried out at 40° C. for 60 minutes, in the same manner as in Example 1. The viscosities of the liquid composition after 0.5 minute and 60 minutes from the start of the measurement are shown in Table 1.

Example 5

The same solvent mixture as in Example 2 was prepared.
350 g (25 mass %) of the fluoropolymer A and 1,050 g (75 mass %) of the solvent mixture were introduced in an autoclave, followed by stirring at 80° C. to prepare a liquid composition. The water content in the liquid composition was 623 ppm. With respect to the liquid composition, the viscosity measurement was carried out at 40° C. for 60 minutes, in the same manner as in Example 1. The viscosities of the liquid composition after 0.5 minute and 60 minutes from the start of the measurement are shown in Table 1.

TABLE 1

|  | Example 2 | | Example 4 | | Example 5 | |
| --- | --- | --- | --- | --- | --- | --- |
| Fluoropolymer A (mass %) | 9.5 | | 15 | | 25 | |
| Measuring time (min) | 0.5 | 60 | 0.5 | 60 | 0.5 | 60 |
| Viscosity (mPa·s) | 26.1 | 34.2 | 265 | 307 | 485 | 592 |

According to the results in Table 1, it is evident that even if the content of the fluoropolymer A is increased, the viscosity increase of the liquid composition is sufficiently suppressed.

Example 6

A solvent mixture having a mixed ratio of ethanol to 1,2-propanediol (ethanol/1,2-propanediol) of 50/50 (mass ratio), was prepared. The water content of the solvent mixture was measured, and it was 934 ppm (0.0934 mass %). Therefore, ethanol was approximately 50 mass %, and 1,2-propanediol was approximately 50 mass %.

A liquid composition was prepared in the same manner as in Example 1 except for using the above solvent mixture. The water content in the liquid composition was 846 ppm. With respect to the liquid composition, the viscosity measurement was carried out at 40° C. for 60 minutes in the same manner as in Example 1. The viscosities of the liquid composition after 0.5 minute and 60 minutes from the start of the measurement are shown in Table 2.

Example 7

A solvent mixture having a mixed ratio of ethanol to 1,2-propanediol (ethanol/1,2-propanediol) of 90/10 (mass ratio), was prepared. The water content of the solvent mixture was measured, and it was 913 ppm (0.0913 mass %). Therefore, ethanol was approximately 90 mass %, and 1,2-propanediol was approximately 10 mass %.

A liquid composition was prepared in the same manner as in Example 1 except for using the above solvent mixture. The water content in the liquid composition was 827 ppm. With respect to the liquid composition, the viscosity measurement was carried out at 40° C. for 60 minutes in the same manner as in Example 1. The viscosities of the liquid composition after 0.5 minute and 60 minutes from the start of the measurement are shown in Table 2.

TABLE 2

|  | Example 7 | | Example 1 | | Example 7 | | Example 3 | |
| --- | --- | --- | --- | --- | --- | --- | --- | --- |
| 1,2-Propanediol/ethanol | 50/50 | | 20/80 | | 10/90 | | 0/100 | |
| Measuring time (min) | 0.5 | 60 | 0.5 | 60 | 0.5 | 60 | 0.5 | 60 |
| Viscosity (mPa·s) | 179.1 | 183.1 | 37.3 | 77.6 | 91.1 | 726 | 252.9 | >1000 |

According to the results in Table 2, it is evident that by adding a polyhydric alcohol, there is an effect for suppressing a viscosity increase of the liquid composition, and such an effect for suppressing is sufficiently exhibited by adjusting the content of the polyhydric alcohol to be at least 20 mass %. On the other hand, with respect to Example 3 which did not contain a polyhydric alcohol, as apparent from FIG. 2, the viscosity rapidly increased in a short period of time, and it exceeded 1,000 mPa·s after 6 minutes, whereby the measurement was impossible.

INDUSTRIAL APPLICABILITY

The liquid composition of the present invention is useful as a raw material when an electrolyte membrane of a polymer electrolyte fuel cell is formed by a casting method.

The entire disclosure of Japanese Patent Application No. 2006-293701 filed on Oct. 30, 2006 including specification, claims, drawings and summary is incorporated herein by reference in its entirety.

What is claimed is:

1. A liquid composition comprising a fluoropolymer having sulfonic acid functional groups and a solvent, wherein the solvent comprises, based on 100 mass % of the solvent, from 5 to 50 mass % of at least one dihydric alcohol and from 50 to 95 mass % of at least one monohydric alcohol, and wherein the water content in the liquid composition is at most 0.5 mass %.

2. The liquid composition according to claim 1, wherein the content of the fluoropolymer is from 5 to 50 mass %, based on 100 mass % of the liquid composition.

3. The liquid composition according to claim 1, wherein the content of the solvent is from 50 to 95 mass %, based on 100 mass % of the liquid composition.

4. The liquid composition according to claim 1, wherein the dihydric alcohol is one member selected from the group consisting of ethylene glycol, 1,2-propanediol and 1,3-propanediol, and the monohydric alcohol is ethanol.

5. The liquid composition according to claim 4, wherein the dihydric alcohol is ethylene glycol.

6. The liquid composition according to claim 4, wherein the dihydric alcohol is 1,2-propanediol.

7. The liquid composition according to claim 4, wherein the dihydric alcohol is 1,3-propanediol.

8. The liquid composition according to claim 1, wherein the fluoropolymer is a copolymer having constituting units based on a monomer represented by the following formula (1) and constituting units based on a monomer represented by the following formula (2), or a copolymer obtained by hydrolyzing the above copolymer to convert W to a sulfonic acid group:

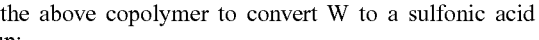

$$CF_2=CX_aX_b \qquad (1)$$

$$CF_2=CF(OCF_2CFX_d)_sO(CF_2)_tW \qquad (2)$$

wherein each of $X_a$ and $X_b$ is independently a fluorine atom, a chlorine atom, a hydrogen atom or a trifluoromethyl group, $X_d$ is a fluorine atom or a trifluoromethyl group, s is an integer of from 0 to 2, t is an integer of from 1 to 3, and W is a precursor group which can be converted to a sulfonic acid group by hydrolysis.

9. The liquid composition according to claim 8, wherein the monomer represented by the formula (1) is $CF_2=CF_2$, and the monomer represented by the formula (2) is $CF_2=CFOCF_2CF(CF_3)OCF_2CF_2SO_2F$.

10. The liquid composition according to claim 1, wherein the ion-exchange capacity of the fluoropolymer is from 0.8 to 1.3 meq/g dry resin.

11. The liquid composition according to claim 1, wherein the dihydric alcohol is present in an amount of from 20 to 50 mass % and the monohydric alcohol is present in an amount of 50 to 80 mass %, based on 100 mass % of the solvent.

12. The liquid composition according to claim 1, wherein an organic solvent other than said solvent may be present in an amount no greater than 5 mass %, based on 100 mass % of the liquid composition.

13. The liquid composition according to claim 12, wherein an organic solvent other than said solvent is present and is a ketone, an ether or an ester.

14. The liquid composition according to claim 1, wherein the ion-exchange capacity of the fluoropolymer is from 0.9 to 1.2 meq/g dry resin.

15. The liquid composition according to claim 1, wherein the content of the solvent is from 75 to 95 mass %, based on 100 mass % of the liquid composition.

16. The liquid composition according to claim 1, wherein the water content is no greater than 0.0965 mass %.

* * * * *